(12) United States Patent
Simonds

(10) Patent No.: US 10,453,135 B2
(45) Date of Patent: *Oct. 22, 2019

(54) COMPUTING ARCHITECTURE FOR MANAGED-ACCOUNT TRANSACTIONS

(71) Applicant: Bank of America Corporation, Charlotte, NC (US)

(72) Inventor: Todd Simonds, Jacksonville, FL (US)

(73) Assignee: Bank of America Corporation, Charlotte, NC (US)

(*) Notice: Subject to any disclaimer, the term of this patent is extended or adjusted under 35 U.S.C. 154(b) by 1073 days.

This patent is subject to a terminal disclaimer.

(21) Appl. No.: 14/853,882

(22) Filed: Sep. 14, 2015

(65) Prior Publication Data

US 2017/0076371 A1  Mar. 16, 2017

(51) Int. Cl.
*G06Q 40/04* (2012.01)
*G06Q 40/06* (2012.01)

(52) U.S. Cl.
CPC .......... *G06Q 40/04* (2013.01); *G06Q 40/06* (2013.01)

(58) Field of Classification Search
None
See application file for complete search history.

(56) References Cited

U.S. PATENT DOCUMENTS

| | | |
|---|---|---|
| 5,758,097 A | 5/1998 | Debe et al. |
| 6,029,148 A | 2/2000 | Zurstrassen |
| 6,161,098 A * | 12/2000 | Wallman ............... G06Q 40/02 705/36 T |
| 6,230,159 B1 * | 5/2001 | Golde ................... G06F 9/4492 |
| 6,601,044 B1 | 7/2003 | Wallman |
| 7,373,324 B1 | 5/2008 | Engin et al. |
| 7,665,662 B2 | 2/2010 | Faulk |
| 7,668,773 B1 | 2/2010 | Pruitt |

(Continued)

FOREIGN PATENT DOCUMENTS

| | | | |
|---|---|---|---|
| WO | 2001033316 A2 | 5/2001 | |
| WO | WO-0133316 A2 * | 5/2001 | ............. G06Q 40/04 |

OTHER PUBLICATIONS

Statement RE: Related Applications, dated Oct. 10, 2015.

(Continued)

*Primary Examiner* — Bennett M Sigmond
*Assistant Examiner* — Bolko M Hamerski
(74) *Attorney, Agent, or Firm* — Banner & Witcoff, Ltd.; Michael A. Springs

(57) ABSTRACT

An improved computing architecture for managed-account transactions is presented. In accordance with embodiments, responsive to receiving a request to purchase a number of units of an asset for an account of a client, a computing system may instantiate, in a client object associated with the client, objects, comprising variables for storing bases for the units and may instantiate, in an account object stored within the client object and associated with the account, objects representing the units. And for each of the units, responsive to receiving data indicating a price and time at which the unit was purchased, the computing system may store, an indication of the price and time and data associating the indication with one of the objects that represents the unit and may store data indicating the price at which the unit was purchased in one of the objects for storing bases for the units.

20 Claims, 9 Drawing Sheets

(56) References Cited

U.S. PATENT DOCUMENTS

| | | | |
|---|---|---|---|
| 7,729,969 | B1 | 6/2010 | Smith, III et al. |
| 8,355,977 | B1 | 1/2013 | Penzak |
| 2002/0077963 | A1 | 6/2002 | Fujino et al. |
| 2003/0105697 | A1* | 6/2003 | Griffin .................. G06Q 40/02 705/36 R |
| 2004/0015858 | A1* | 1/2004 | Seto ....................... G06F 9/449 717/120 |
| 2005/0044035 | A1 | 2/2005 | Scott |
| 2005/0114243 | A1* | 5/2005 | Scumniotales ........ G06Q 10/10 705/35 |
| 2005/0131793 | A1 | 6/2005 | Hill |
| 2006/0231617 | A1 | 10/2006 | Faulk |
| 2007/0168273 | A1* | 7/2007 | Barone .................. G06Q 40/06 705/36 R |
| 2007/0174182 | A1 | 7/2007 | Bodurtha et al. |
| 2007/0192223 | A1* | 8/2007 | Cifrese .................. G06Q 40/06 705/36 R |
| 2008/0027847 | A1 | 1/2008 | Masucci |
| 2008/0140547 | A1 | 6/2008 | Murphy et al. |
| 2009/0198630 | A1 | 8/2009 | Treitler et al. |
| 2010/0131422 | A1 | 5/2010 | Penzak |
| 2011/0258139 | A1 | 10/2011 | Steiner |
| 2012/0011080 | A1* | 1/2012 | Smith .................... G06Q 40/06 705/36 R |
| 2014/0365399 | A1 | 12/2014 | Dennelly et al. |
| 2015/0262306 | A1* | 9/2015 | Gottstein ............... G06Q 40/06 705/36 T |

OTHER PUBLICATIONS

Jun. 6, 2006 (US) U.S. Provisional Drawings—U.S. Appl. No. 10/372,706 relied upon by US-20070168273-A1 for filing date and incorporated by reference. (Year: 2003).

Jun. 6, 2006 (US) U.S. Provisional Specification—U.S. Appl. No. 10/372,706, relied upon by US-20070168273-A1 for filing date and incorporated by reference. (Year: 2003).

Aug. 10, 2018 (US) Non-Final Office Action—U.S. Appl. No. 14/853,895.

Jul. 20, 2018 (US) Final Office Action—U.S. Appl. No. 14/853,768.

Mar. 8, 2018 (US) Non-Final Office Action—U.S. Appl. No. 14/853,768.

Pollock, Michael A, "Investing in Funds: A Quarterly Analysis—Portfolio Strategy: One Fund, Many Experts Multisleeve' funds tap specialists in several different assets or strategies," Wall Street Journal, New York, NY, Oct. 4, 2010, retrieved from https://www.wsj.com/articles/SB10001424052748704901104575423230410865818, 2 pages.

Zwecher, M.J. "sleeving" definition in "Glossary" in Retirement Portfolios. (NJ, John Wiley & Sons, 2010), p. 268 (Year: 2010).

Dec. 31, 2018 (US) Non-Final Office Action—U.S. Appl. No. 14/853,785.

Jan. 7, 2019 (US) Non-Final Office Action—U.S. Appl. No. 14/853,923.

* cited by examiner

COMPUTING ARCHITECTURE FOR MANAGED-ACCOUNT TRANSACTIONS

BACKGROUND

Existing computing architectures for managed-account transactions present many shortcomings. For example, conventional architectures are typically based exclusively on settlement-date data and utilize shadow accounting, which often presents reporting and reconciliation challenges, both in the performance and regulatory contexts. These challenges are exacerbated by the failure of such architectures to utilize data schemas and structures designed from the outset for managed-account transactions, as well as a lack of appropriate data quality checks throughout their lifecycles. Accordingly, a need exists for an improved computing architecture for managed-account transactions.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a computing system may receive data indicating an allocation of investments prescribed by a first investment manager and an allocation of investments prescribed by a second investment manager. The computing system may generate, in accordance with the allocation of investments prescribed by the first investment manager, a first investment strategy and may generate, in accordance with the allocation of investments prescribed by the second investment manager, a second investment strategy. Responsive to receiving a request to allocate funds of a client amongst the first investment strategy and the second investment strategy, the computing system may instantiate, in an account object associated with the client, a sleeve object for the first investment strategy and a sleeve object for the second investment strategy.

In some embodiments, for each asset of a plurality of assets prescribed by the first investment manager, the computing system may determine, based on a percentage to be invested in the asset indicated by the first investment strategy and a percentage of the funds allocated by the request to the first investment strategy, a number of units of the asset to be purchased for the client and may instantiate, in the sleeve object for the first investment strategy and for each unit of the units, an object representing the unit. Similarly, in such embodiments, for each asset of a plurality of assets prescribed by the second investment manager, the computing system may determine, based on a percentage to be invested in the asset indicated by the second investment strategy and a percentage of the funds allocated by the request to the second investment strategy, a number of units of the asset to be purchased for the client and may instantiate, in the sleeve object for the second investment strategy and for each unit of the units, an object representing the unit.

In some embodiments, for each asset of the plurality of assets prescribed by the first investment manager and each unit of the units, the computing system may generate instructions to purchase the unit and may communicate the instructions to purchase the unit to one or more trading platforms. Similarly, in such embodiments, for each asset of the plurality of assets prescribed by the second investment manager and each unit of the units, the computing system may generate instructions to purchase the unit and may communicate the instructions to purchase the unit to the trading platform(s). Responsive to receiving, from the one or more trading platforms and for each asset of the plurality of assets prescribed by the first investment manager and each unit of the units, data indicating a price and time at which the unit was purchased, the computing system may store an indication of the price and time at which the unit was purchased and data associating the indication with the object representing the unit. Similarly, responsive to receiving, from the one or more trading platforms and for each asset of the plurality of assets prescribed by the second investment manager and each unit of the units, data indicating a price and time at which the unit was purchased, the computing system may store an indication of the price and time at which the unit was purchased and data associating the indication with the object representing the unit.

In some embodiments, the computing system may identify, for at least one asset of the plurality of assets prescribed by the first investment manager, one or more objects in the account object representing previously purchased units of the asset. In such embodiments, the computing system may store, in the sleeve object for the first investment strategy, at least a portion of the one or more objects representing the previously purchased units of the asset, may determine a current market price for the asset, and may store an indication of the current market price and a time at which the one or more objects representing the previously purchased units of the asset were stored in the sleeve object for the first investment strategy.

In some embodiments, the computing system may determine, at an interval specified by the request, a current market valuation for assets represented by objects stored in the sleeve object for the first investment strategy and a current market valuation for assets represented by objects stored in the sleeve object for the second investment strategy. In such embodiments, responsive to determining that a ratio of the current market valuation for assets represented by objects stored in the sleeve object for the first investment strategy to the current market valuation for assets represented by objects stored in the sleeve object for the second investment strategy exceeds a ratio of the percentage of the funds allocated by the request to the first investment strategy to the percentage of the funds allocated by the request to the second investment strategy by a threshold amount, the computing system may reallocate one or more of the assets represented by a portion of the objects stored in the sleeve object for the first investment strategy to the second investment strategy.

For example, in some embodiments, the computing system may move the portion of the objects stored in the sleeve object for the first investment strategy to the sleeve object for the second investment strategy, may determine a current market price for each of the asset(s), and may store an indication of the current market price for each of the asset(s) and a time at which the portion of the objects stored in the sleeve object for the first investment strategy were moved to the sleeve object for the second investment strategy.

Additionally or alternatively, the computing system may generate instructions to sell the asset(s) and may communicate the instructions to one or more trading platforms.

Responsive to receiving from the trading platform(s), data indicating prices and times at which the asset(s) were sold, the computing system may store an indication of the prices and times at which the asset(s) were sold and data associating the indication with the sleeve object for the first investment strategy and may determine an amount of funds generated by selling the asset(s). For each asset of the plurality of assets prescribed by the second investment manager, the computing system may determine, based on the second investment strategy and the amount of funds generated by selling the asset(s), a number of additional units of the asset to be purchased for the client. For each unit of the additional units, the computing system may instantiate, in the sleeve object for the second investment strategy, an object representing the unit, may generate instructions to purchase the unit, may communicate the instructions to purchase the unit to the trading platform(s), and, responsive to receiving, from the trading platform(s), data indicating a price and time at which the unit was purchased, may store an indication of the price and time at which the unit was purchased and data associating the indication with the object representing the unit.

In some embodiments, responsive to receiving data indicating a modification to an allocation of investments prescribed by a first investment manager and a modification to an allocation of investments prescribed by a second investment manager, the computing system may update the first investment strategy based on the modification to the allocation of investments prescribed by the first investment manager and may update the second investment strategy based on the modification to the allocation of investments prescribed by the second investment manager. In such embodiments, the computing system may identify the account object associated with the client, may modify a plurality of objects in the sleeve object for the first investment strategy in accordance with the modification to the allocation of investments prescribed by the first investment manager, and may modify a plurality of objects in the sleeve object for the second investment strategy in accordance with the modification to the allocation of investments prescribed by the second investment manager.

In some embodiments, responsive to determining that the modification to the allocation of investments prescribed by the first investment manager comprises a decrease in an asset prescribed by the first investment manager for which the modification to the allocation of investments prescribed by the second investment manager comprises an increase, the computing system may determine, based on a percentage to be invested in the asset indicated by the first investment strategy, a percentage to be invested in the asset indicated by the second investment strategy, a percentage of the funds allocated to the first investment strategy, and a percentage of the funds allocated to the second investment strategy, a number of units of the asset to reallocate to the second investment strategy. In such embodiments, the computing system may move a portion of the plurality of objects in the sleeve object for the first investment strategy representing the number of units to the sleeve object for the second investment strategy, may determine a current market price for the asset, and may store an indication of the current market price, the number of units, and a time at which the portion of the plurality of objects in the sleeve object for the first investment strategy were moved to the sleeve object for the second investment strategy.

In some embodiments, responsive to determining, based on the percentage to be invested in the asset indicated by the second investment strategy and the percentage of the funds allocated to the second investment strategy, that a total number of units of the asset to be held by the client for the second investment strategy in accordance with the modification to the allocation of investments prescribed by the second investment manager is greater than a sum of a number of units of the asset previously held by the client for the second investment strategy and the number of units of the asset reallocated to the second investment strategy from the first investment strategy, for each unit of a number of units of the asset corresponding to a difference between the total number of units and the sum, the computing system may instantiate, in the sleeve object for the second investment strategy, an object representing the unit, may generate instructions to purchase the unit, may communicate the instructions to one or more trading platforms, and, responsive to receiving, from the trading platform(s), data indicating a price and time at which the unit was purchased, may store an indication of the price and time at which the unit was purchased and data associating the indication with the object representing the unit.

In some embodiments, responsive to determining, after moving the portion of the plurality of objects in the sleeve object for the first investment strategy representing the number of units to the sleeve object for the second investment strategy, and based on the percentage to be invested in the asset indicated by the first investment strategy and the percentage of the funds allocated to the first investment strategy, that a total number of units of the asset to be held by the client for the first investment strategy in accordance with the modification to the allocation of investments prescribed by the first investment manager is less than a number of units of the asset held by the client for the first investment strategy, for each unit of a number of units of the asset corresponding to a difference between the number of units of the asset held by the client for the first investment strategy and the total number of units, the computing system may generate instructions to sell the unit, may communicate the instructions to one or more trading platforms, and, responsive to receiving, from the trading platform(s), data indicating a price and time at which the unit was sold, may store an indication of the price and time at which the unit was sold and data associating the indication with the sleeve object for the first investment strategy.

In some embodiments, responsive to determining that the modification to the allocation of investments prescribed by the second investment manager comprises a decrease in an asset prescribed by the second investment manager for which the modification to the allocation of investments prescribed by the first investment manager comprises an increase, the computing system may determine, based on a percentage to be invested in the asset indicated by the first investment strategy, a percentage to be invested in the asset indicated by the second investment strategy, a percentage of the funds allocated to the first investment strategy, and a percentage of the funds allocated to the second investment strategy, a number of units of the asset to reallocate to the first investment strategy, may move a portion of the plurality of objects in the sleeve object for the second investment strategy representing the number of units to the sleeve object for the first investment strategy, may determine a current market price for the asset, and may store an indication of the current market price, the number of units, and a time at which the portion of the plurality of objects in the sleeve object for the second investment strategy were moved to the sleeve object for the first investment strategy.

In some embodiments, responsive to determining that a dividend for the asset was paid for a period of time prior to the time at which the portion of the plurality of objects in the sleeve object for the second investment strategy were moved to the sleeve object for the first investment strategy, the computing system may allocate the dividend to the second investment strategy. In such embodiments, the computing system may determine, based on a percentage to be invested in the asset indicated by the second investment strategy, the percentage of the funds allocated to the second investment strategy, and an amount of the dividend, a number of units of the asset to be purchased for the client and, for each unit of the units, may instantiate, in the sleeve object for the second investment strategy, an object representing the unit, may generate instructions to purchase the unit, may communicate the instructions to one or more trading platforms, and, responsive to receiving, from the trading platform(s), data indicating a price and time at which the unit was purchased, may store an indication of the price and time at which the unit was purchased and data associating the indication with the object representing the unit.

In some embodiments, responsive to receiving data indicating a plurality of elective options for a dividend to be paid by an issuer of an asset included in the allocation of investments prescribed by the first investment manager and the allocation of investments prescribed by the second investment manager, the computing system may generate a ballot comprising the plurality of elective options for the dividend and may communicate the ballot to one or more computing devices associated with the first investment manager and the second investment manager. The computing system may receive, from the computing device(s), data indicating an election made by the first investment manager, via the ballot, indicating how the dividend should be paid for a plurality of assets invested in accordance with the first investment strategy and an election made by the second investment manager, via the ballot, indicating how the dividend should be paid for a plurality of assets invested in accordance with the second investment strategy. For each unit of a plurality of units of the asset held by the client, responsive to determining that the unit is invested in accordance with the first investment strategy, the computing system may store, in the memory, an indication of how the dividend should be paid for the plurality of assets invested in accordance with the first investment strategy and data associating the indication with an object corresponding to the unit and stored in the sleeve object for the first investment strategy, and responsive to determining that the unit is invested in accordance with the second investment strategy, the computing system may store, in the memory, an indication of how the dividend should be paid for the plurality of assets invested in accordance with the second investment strategy and data associating the indication with an object corresponding to the unit and stored in the sleeve object for the second investment strategy.

In some embodiments, responsive to identifying, an availability of funds associated with the dividend and additional units of the asset associated with the dividend, the computing system may, for each unit of the plurality of units of the asset held by the client, responsive to determining, based on the indication and the data associating the indication with the object corresponding to the unit, that the unit is invested in accordance with the first investment strategy and that a portion of the funds associated with the dividend should be allocated to the unit, instantiate, in the sleeve object for the first investment strategy, one or more objects representing the portion of the funds and responsive to determining, based on the indication and the data associating the indication with the object corresponding to the unit, that the unit is invested in accordance with the second investment strategy and that a portion of the additional units of the asset associated with the dividend should be allocated to the unit, instantiate, in the sleeve object for the second investment strategy and for each additional unit in the portion of the additional units, an object representing the additional unit.

In some embodiments, the computing system may allocate, based on the first investment strategy, the portion of the funds to one or more assets included in the allocation of investments prescribed by the first investment manager and may determine, based on the first investment strategy and for each asset of the one or more assets, a number of units of the asset to be purchased for the client. In such embodiments, the computing system may, for each asset of the one or more assets and each unit of the units, instantiate, in the sleeve object for the first investment strategy, an object representing the unit, generate instructions to purchase the unit, communicate the instructions to one or more trading platforms, and responsive to receiving, from the trading platform(s), data indicating a price and time at which the unit was purchased, store, in the memory, an indication of the price and time at which the unit was purchased and data associating the indication with the object representing the unit.

In some embodiments, the computing system may allocate, based on the second investment strategy, one or more units in the portion of the additional units to one or more assets included in the allocation of investments prescribed by the second investment manager, may determine, based on the second investment strategy and a current market valuation of the one or more units in the portion of the additional units, and for each asset of the one or more assets, a number of units of the asset to be purchased for the client, and may instantiate, in the sleeve object for the second investment strategy and for each asset of the one or more assets and each unit of the units, an object representing the unit. In such embodiments, the computing system may, for each unit of the one or more units in the portion of the additional units, generate instructions to sell the unit, communicate the instructions to one or more trading platforms, and responsive to receiving, from the trading platform(s), data indicating a price and time at which the unit was sold, store, in the memory, an indication of the price and time at which the unit was sold and data associating the indication with the object representing the unit. In some embodiments, the computing system may, for each asset of the one or more assets and each unit of the units, generate instructions to purchase the unit, communicate the instructions to the trading platform(s), and responsive to receiving, from the trading platform(s), data indicating a price and time at which the unit was purchased, store, in the memory, an indication of the price and time at which the unit was purchased and data associating the indication with the object representing the unit.

In some embodiments, the computing system may generate a request for the first investment manager to verify the allocation of investments prescribed by the first investment manager and a request for the second investment manager to verify the allocation of investments prescribed by the second investment manager and may communicate the requests to the computing device(s) associated with the first investment manager and the second investment manager. In such embodiments, responsive to a determination by the at least one processor that the election made by the first investment manager has been received and that the election made by the second investment manager has not been received, the computing system may communicate, to one or more computing devices associated with the second investment manager, an additional request for the second investment manager to verify the allocation of investments prescribed by the second investment manager, and the additional request may indicate that the election made by the second investment manager has not been received.

In some embodiments, the election made by the first invest manager may indicate that the dividend should be paid via a first method for a portion of the plurality of assets invested in accordance with the first investment strategy held in taxable accounts and via a second method for a portion of the plurality of assets invested in accordance with the first investment strategy held in tax-exempt accounts, and the first method may be different from the second method.

In some embodiments, responsive to determining to purchase a unit of an asset for the client, the computing system may instantiate, in the client object, an object comprising a variable for storing a basis for the unit. In such embodiments, responsive to receiving data indicating a price and time at which the unit was purchased, the computing system may store, in the variable for storing the basis for the unit, data indicating the price at which the unit was purchased.

In some embodiments, responsive to determining to sell a unit of an asset for the client, the computing system may select, from amongst a plurality of bases for the asset stored in a plurality of objects associated with the asset and stored in the client object, a basis for the unit. In such embodiments, responsive to receiving data indicating a price and time at which the unit was sold, the computing system may determine a difference between the basis for the unit and the price at which the unit was sold. In some embodiments, the selected basis may be associated with a unit of the asset purchased for a different investment strategy and/or a different account of the client.

In some embodiments, the computing system may select the basis for the unit based on a predetermined parameter for the client or the account. For example, the predetermined parameter may indicate that a highest available basis for the unit should be utilized for the unit, and the computing system may select, from amongst the plurality of bases for the asset, the highest basis. Alternatively, the predetermined parameter may indicate that a lowest available basis for the unit should be utilized for the unit, and the computing system may select, from amongst the plurality of bases for the asset, the lowest basis.

In some embodiments, the predetermined parameter may comprise a realized gain-loss value for the client. In such embodiments, the computing system may select, based on a current market valuation of the unit, a basis having a difference with the current market valuation of the unit that is closest to the realized gain-loss value for the client. In some embodiments, the realized gain-loss value for the client may reflect one or more losses carried forward by the client from a time at least one year prior to a time at which the unit was sold.

In some embodiments, the computing system may determine a performance composite for an investment strategy (e.g., the first investment strategy and/or the second investment strategy). In such embodiments, the computing system may identify, in its memory, a plurality of account objects comprising a plurality of sleeve objects for the investment strategy and may identify a portion of the plurality of account objects meeting one or more criteria of the performance composite. The computing system may determine the performance composite based on data stored in a portion of the plurality of sleeve objects stored in the portion of the plurality of account objects, may generate a report indicating the performance composite, and may communicate the report to one or more computing devices associated with the plurality of account objects.

In some embodiments, for each account object of the portion of the plurality of account objects, the computing system may determine that the account object does not comprise data indicating one or more asset restrictions specified by the one or more criteria. In some embodiments, for each account object of the portion of the plurality of account objects, the computing system may determine that the account object comprised a sleeve object of the plurality of sleeve objects for each day of a time range specified by the one or more criteria. In such embodiments, the computing system may determine a market valuation at a beginning of the time range for assets held within the sleeve object at the beginning of the time range, a market valuation at an end of the time range for assets held within the sleeve object at the end of the time range, and a ratio of the market valuation at the beginning of the time range to the market valuation at the end of the time range.

In some embodiments, the report may comprise a comparison of the performance composite with a plurality of other performance composites. For example, the one or more criteria may specify a time range for the performance composite, and the plurality of other performance composites may comprise one or more performance composites for the investment strategy indicating performance of the investment strategy over one or more periods of time beginning before the time range. Additionally or alternatively, the plurality of other performance composites may comprise one or more performance composites for a different investment strategy indicating performance of the different investment strategy over the time range and/or the one or more periods of time beginning before the time range.

In some embodiments, responsive to a request to purchase one or more units of an asset for an account of a client, the computing system may identify a customized rule for the account, the client, and/or the asset. In such embodiments, responsive to identifying the customized rule, the computing system may determine whether the request meets each of one or more criteria specified by the customized rule before purchasing the unit(s).

In some embodiments, the computing system may determine that an account object associated with the account does not comprise data indicating one or more asset restrictions that implicate the asset. In such embodiments, the client object in which the account object associated with the account is stored may comprise a different account object, and the different account object may comprise data indicating one or more asset restrictions that implicate the asset. For example, the request may be based on an investment decision by an entity different from an entity where the account is maintained, the asset may be restricted based on the entity where the account is maintained, and investment decisions for an account associated with the different account object may be made by the entity where the account is maintained.

In some embodiments, the computing system may determine that the request meets one or more criteria prescribed by a government of a state associated with the request. For example, the computing system may determine that the request meets a licensure requirement for a type of the asset. Additionally or alternatively, the computing system may determine that the request meets a disclosure requirement for the asset.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
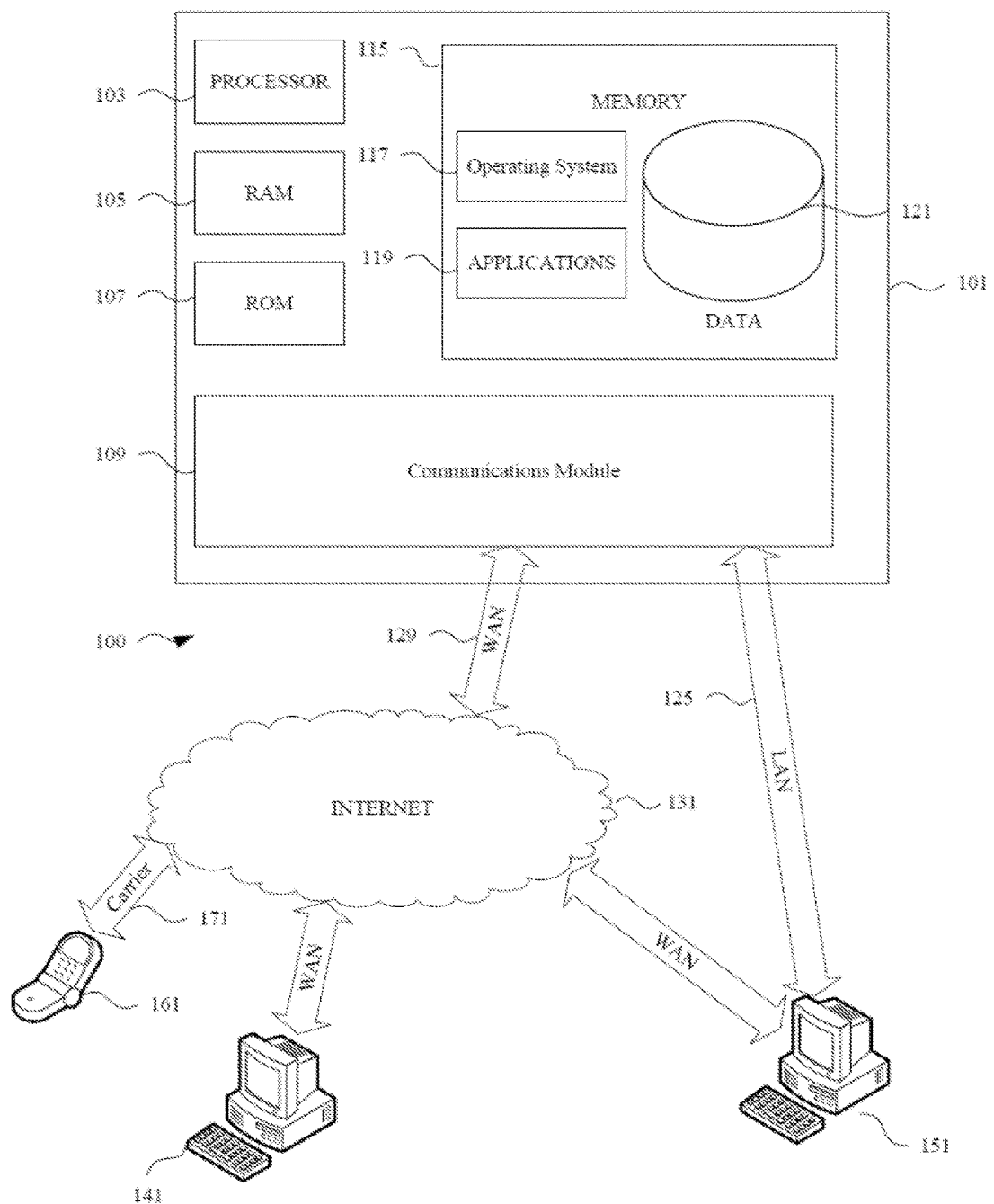
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
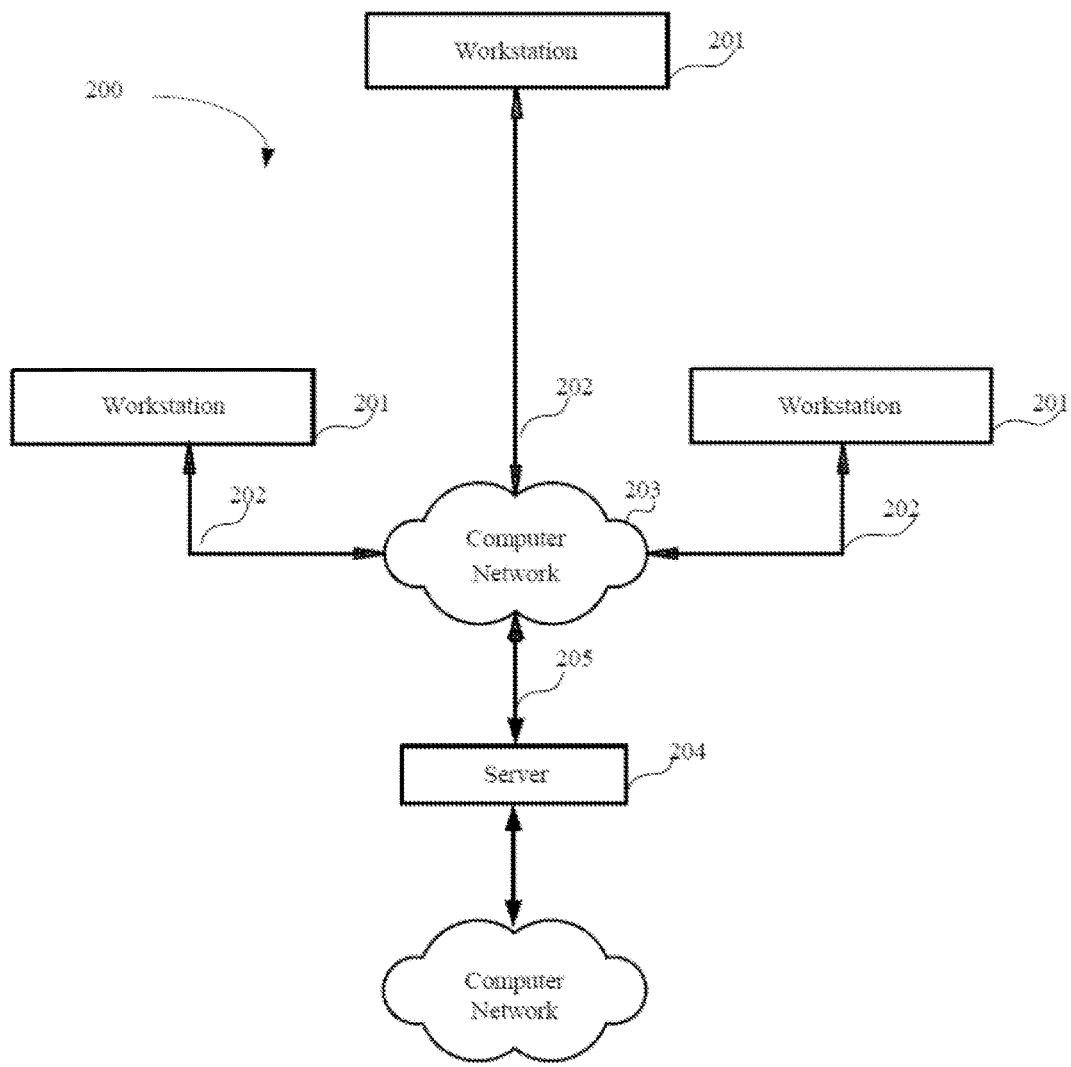
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
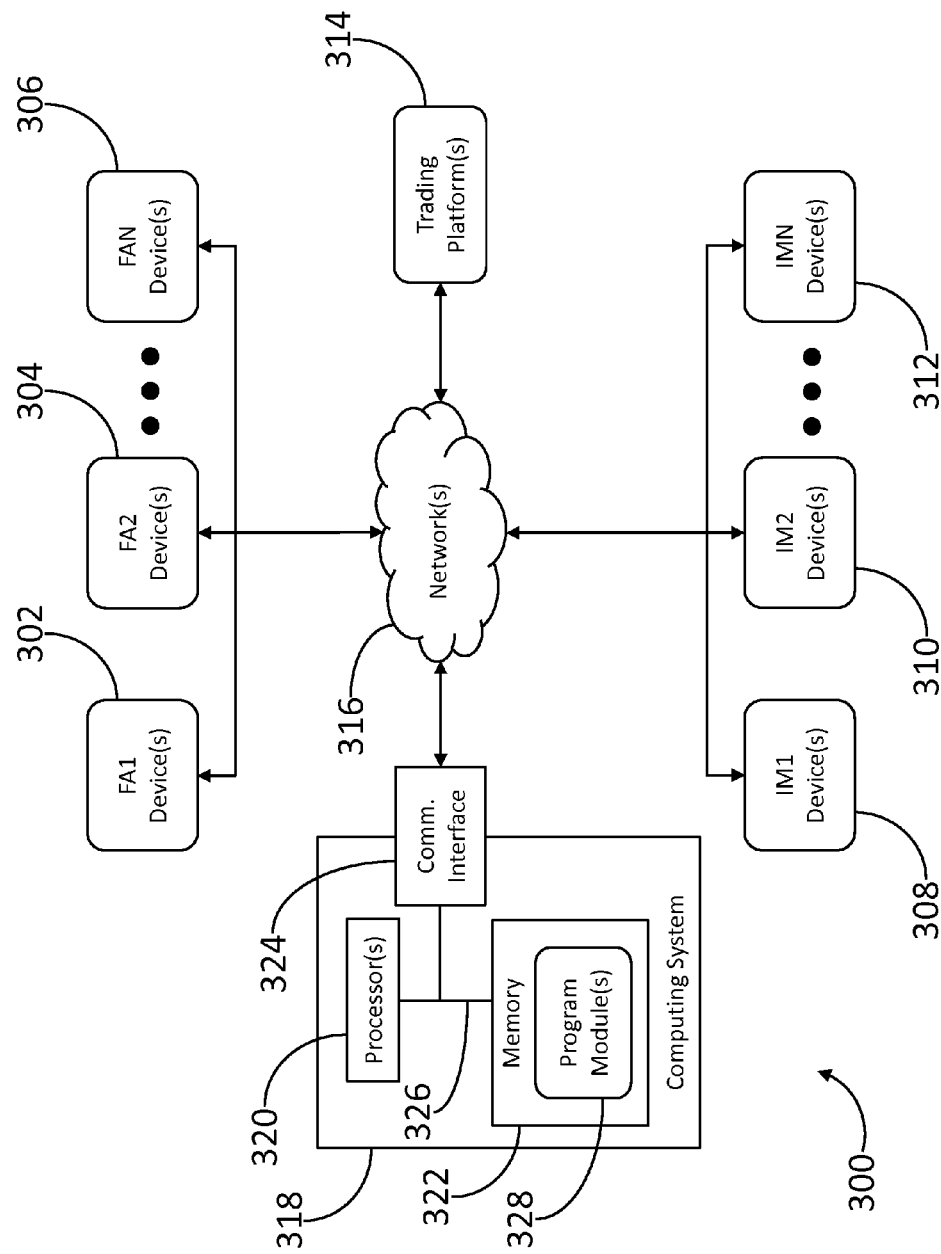
FIG. 3 depicts an illustrative computing environment in accordance with one or more example embodiments.

FIG. 3 depicts an illustrative computing environment in accordance with one or more example embodiments. Referring to FIG. 3, computing environment 300 may be associated with an organization (e.g., a financial institution, or the like) and may include one or more computing devices. For example, computing environment 300 may include computing device(s) 302, 304, and 306, which may be associated with one or more financial advisors affiliated with the organization, and computing device(s) 308, 310, and 312, which may be associated with one or more investment managers that may or may not be affiliated with the organization. Computing environment 300 may also include one or more computing platforms. For example, computing environment 300 may include trading platform(s) 314. Computing device(s) 302, 304, 306, 308, 310, and 312 and/or trading platform(s) 314 may include any combination of computing devices (e.g., desktop computers, laptop computers, tablet computers, smart phones, servers, server blades, mainframes, virtual machines, or the like) configured to perform one or more of the functions described herein.

Computing environment 300 may also include one or more networks. For example, computing environment 300 may include network(s) 316, which may include one or more sub-networks (e.g., LANs, WANs, VPNs, or the like) and may interconnect one or more of computing device(s) 302, 304, 306, 308, 310, and 312, trading platform(s) 314, and/or computing system 318. Computing system 318, which in some embodiments, may include one or more of computing device(s) 302, 304, 306, 308, 310, and 312 and/or trading platform(s) 314, may comprise one or more processor(s) 320, memory 322, communication interface 324, and/or data bus 326. Data bus 326 may interconnect processor(s) 320, memory 322, and/or communication interface 324. Communication interface 324 may be a network interface configured to support communications between computing system 318 and network(s) 316 (or one or more sub-networks thereof) (e.g., communications between computing system 318 and one or more of computing device(s) 302, 304, 306, 308, 310, and 312 and/or trading platform(s) 314. Memory 322 may include program module(s) 328, which may comprise instructions that when executed by processor(s) 320 cause computing system 318 to perform one or more functions described herein.

Figure 4A:
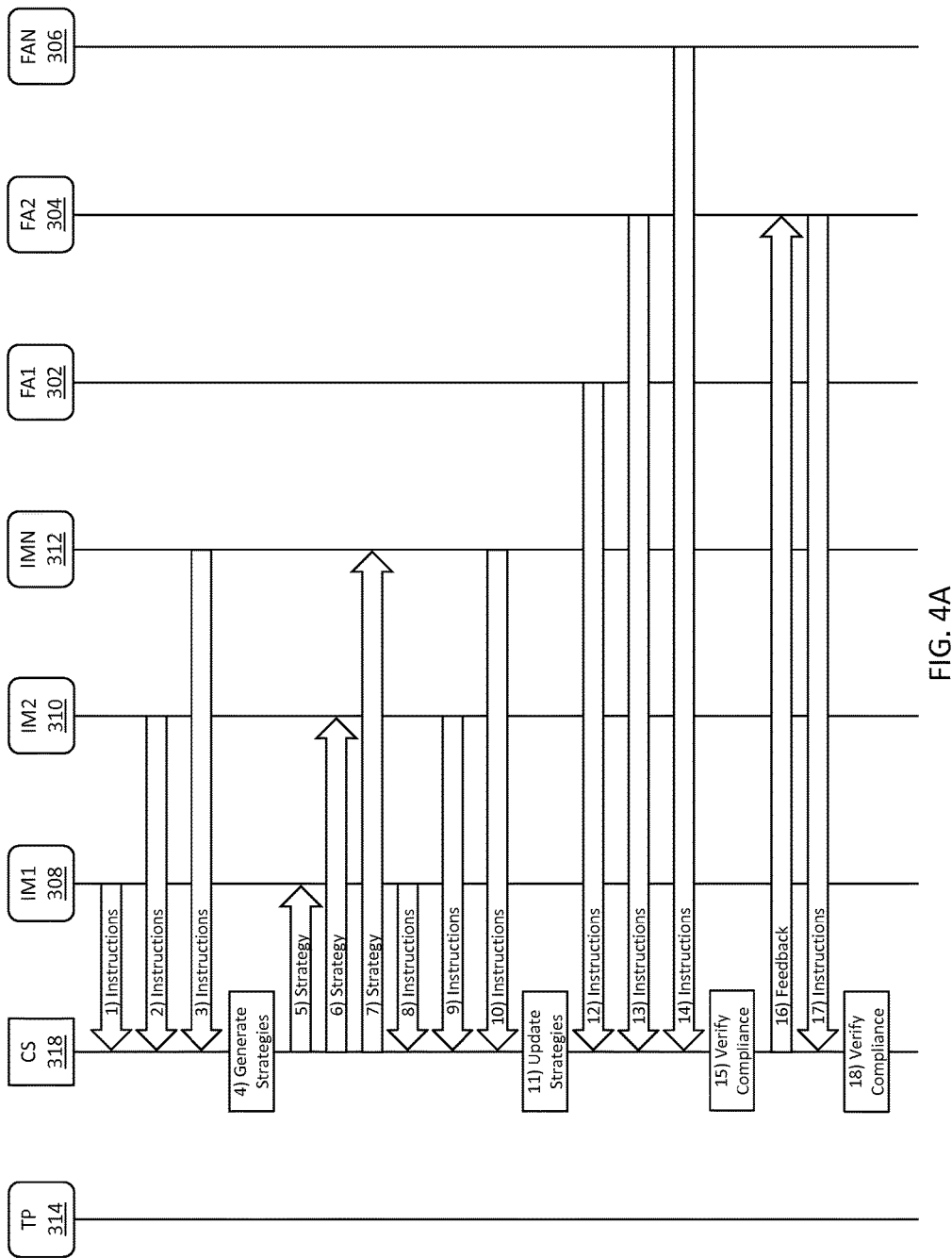
FIGS. 4A, 4B, 4C, and 4D depict an illustrative event sequence in accordance with one or more example embodiments.

FIGS. 4A, 4B, 4C, and 4D depict an illustrative event sequence in accordance with one or more example embodiments. Referring to FIG. 4A, at step 1, computing system 318 may receive (e.g., via communication interface 324 and network(s) 316) data indicating an allocation of investments prescribed by an investment manager associated with computing device(s) 308. Similarly, at step 2, computing system 318 may receive data indicating an allocation of investments prescribed by an investment manager associated with computing device(s) 310; and, at step 3, computing system 318 may receive data indicating an allocation of investments prescribed by an investment manager associated with computing device(s) 312. At step 4, computing system 318 may generate investment strategies in accordance with the investment allocations prescribed by the investment managers associated with computing device(s) 308, 310, and 312. For example, the allocation of investments prescribed by the investment manager associated with computing device(s) 308 may comprise a plurality of different assets (e.g., assets A, B, and Z) and may specify a percentage of invested funds that should be allocated to each of the different assets (e.g., 50% to A, 33% to B, and 17% to Z), and computing system 318 may generate, based on the data received from computing device(s) 308, an investment strategy in accordance with the allocation prescribed by the investment manager associated with computing device(s) 308 (e.g., 50% to A (or an analogous asset), 33% to B (or an analogous asset), and 17% to Z (or an analogous asset)). Similarly, the allocation of investments prescribed by the investment manager associated with computing device(s) 310 may comprise a plurality of different assets (e.g., assets A, B, and Z) and may specify a percentage of invested funds that should be allocated to each of the different assets (e.g., 33% to A, 50% to B, and 17% to Z), and computing system 318 may generate, based on the data received from computing device(s) 310, an investment strategy in accordance with the allocation prescribed by the investment manager associated with computing device(s) 310 (e.g., 33% to A (or an analogous asset), 50% to B (or an analogous asset), and 17% to Z (or an analogous asset)); and the allocation of investments prescribed by the investment manager associated with computing device(s) 312 may comprise a plurality of different assets (e.g., assets A, B, and Z) and may specify a percentage of invested funds that should be allocated to each of the different assets (e.g., 17% to A, 66% to B, and 17% to Z), and computing system 318 may generate, based on the data received from computing device(s) 312, an investment strategy in accordance with the allocation prescribed by the investment manager associated with computing device(s) 312 (e.g., 17% to A (or an analogous asset), 66% to B (or an analogous asset), and 17% to Z (or an analogous asset)).

At step 5, computing system 318 may generate data indicating the allocation prescribed by the investment manager associated with computing device(s) 308 (and/or the corresponding investment strategy generated by computing system 318) and requesting that the investment manager approve the allocation (and/or corresponding strategy) and may communicate (e.g., via communication interface 324 and network(s) 316) the data to computing device(s) 308. Similarly, at step 6, computing system 318 may generate data indicating the allocation prescribed by the investment manager associated with computing device(s) 310 (and/or the corresponding investment strategy generated by computing system 318) and requesting that the investment manager approve the allocation (and/or corresponding strategy) and may communicate the data to computing device(s) 310; and, at step 7, computing system 318 may generate data indicating the allocation prescribed by the investment manager associated with computing device(s) 312 (and/or the corresponding investment strategy generated by computing system 318) and requesting that the investment manager approve the allocation (and/or corresponding strategy) and may communicate the data to computing device(s) 312.

At step 8, computing system 318 may receive data from computing device(s) 308 comprising instructions indicating whether the investment manager associated with computing device(s) 308 has approved the allocation (and/or corresponding strategy) or made one or more modifications to the allocation (and/or corresponding strategy). Similarly, at step 9, computing system 318 may receive data from computing device(s) 310 comprising instructions indicating whether the investment manager associated with computing device(s) 310 has approved the allocation (and/or corresponding strategy) or made one or more modifications to the allocation (and/or corresponding strategy); and, at step 10, computing system 318 may receive data from computing device(s) 312 comprising instructions indicating whether the investment manager associated with computing device(s) 312 has approved the allocation (and/or corresponding strategy) or made one or more modifications to the allocation (and/or corresponding strategy). At step 11, as will be described in greater detail below, in the event that the data received from computing device(s) 308, 310, or 312 indicates that one or more of the allocations has been modified, computing system 318 may update the corresponding investment strategies in accordance with the modifications.

At step 12, computing system 318 may receive (e.g., via communication interface 324 and network(s) 316) data from computing device(s) 302 comprising instructions from a financial advisor associated with computing device(s) 302 and requesting that funds of a client be allocated amongst one or more of the investment strategies generated by computing system 318. Similarly, at step 13, computing system 318 may receive data from computing device(s) 304 comprising instructions from a financial advisor associated with computing device(s) 304 and requesting that funds of a client be allocated amongst one or more of the investment strategies; and, at step 14, computing system 318 may receive data from computing device(s) 306 comprising instructions from a financial advisor associated with computing device(s) 306 and requesting that funds of a client be allocated amongst one or more of the investment strategies.

At step 15, as will be described in greater detail below, responsive to determining that the instructions received from computing device(s) 302, 304, or 306 comprise a request that would involve the purchase of one or more units of an asset (e.g., A, B, or Z), computing system 318 may determine whether a customized rule exists for the asset, the client, or an account for which the unit(s) would be purchased. Responsive to identifying a customized rule, computing system 318 may determine whether the request meets each of one or more criteria specified by the customized rule before purchasing the unit(s). And responsive to determining that the requests fails to meet one or more of the criteria, computing system 318 may generate data comprising feedback for the financial advisor (e.g., indicating the failure and/or identifying the pertinent criteria or rule) and may communicate the data to computing device(s) 302, 304, or 306. For example, the instructions received from computing device(s) 304 may comprise a request that would involve the purchase of one or more units of an asset for a client, computing system 318 may identify a customized rule (e.g., for the asset, the client, or an account for which the unit(s) would be purchased), may determine that the request fails to meet one or more criteria specified by the customized rule, may generate data comprising feedback for the financial advisor associated with computing device(s) 304 (e.g., to prompt the financial advisor to address the issue and/or modify the request), and, at step 16, may communicate (e.g., via communication interface 324 and network(s) 316) the data comprising the feedback to computing device(s) 304. At step 17, computing system 318 may receive data from computing device(s) 304 comprising instructions from the financial advisor associated with computing device(s) 304 and requesting that funds of a client be allocated amongst one or more of the investment strategies, and, at step 18, computing system 318 may determine that the request does not implicate a customized rule or meets each of the criteria specified by one or more customized rules implicated by the request. For example, upon reviewing the feedback, the financial advisor associated with computing device(s) 304 may have addressed the issue and/or modified their previous request.

Figure 4B:
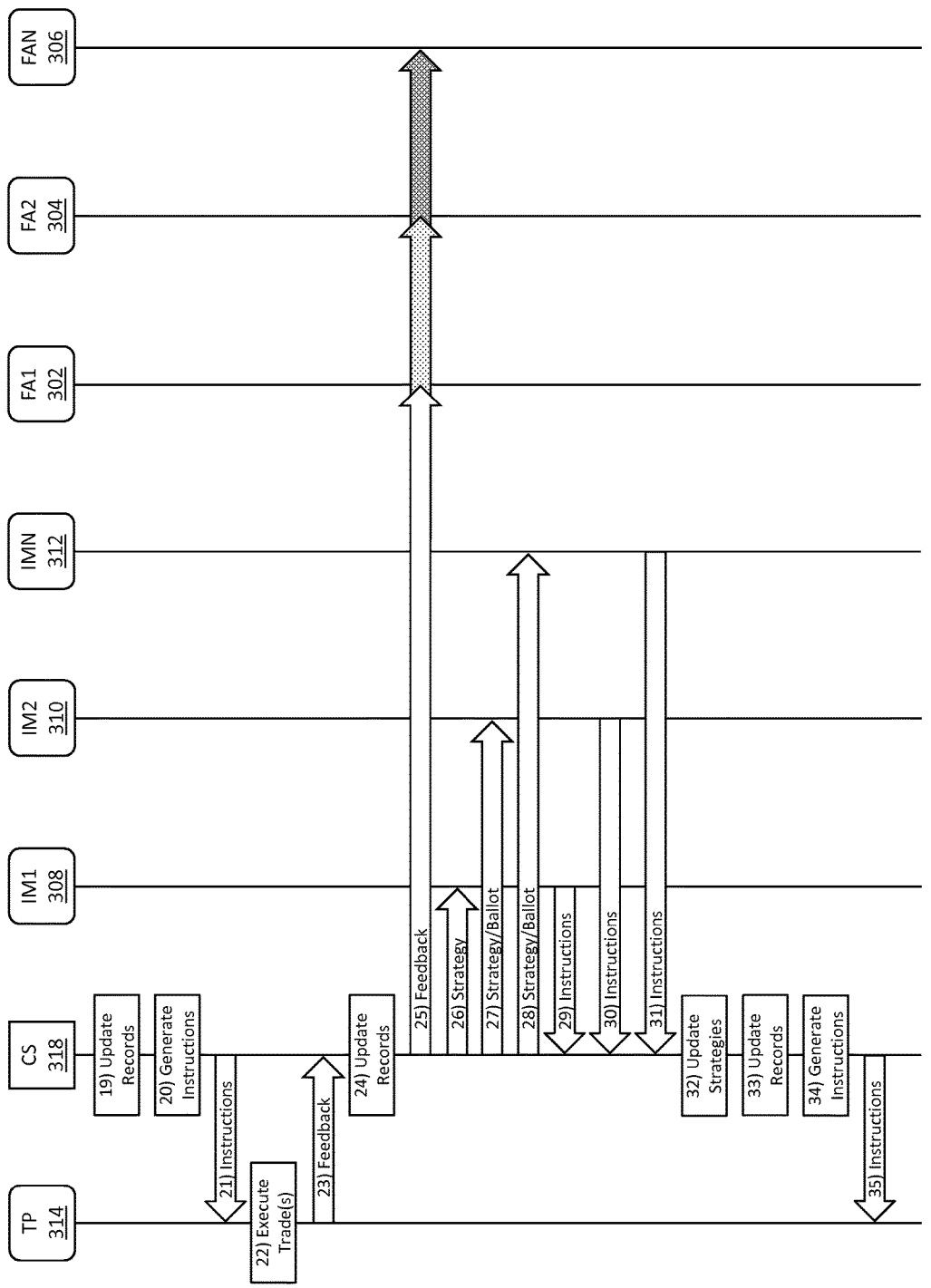
Figure 4C:
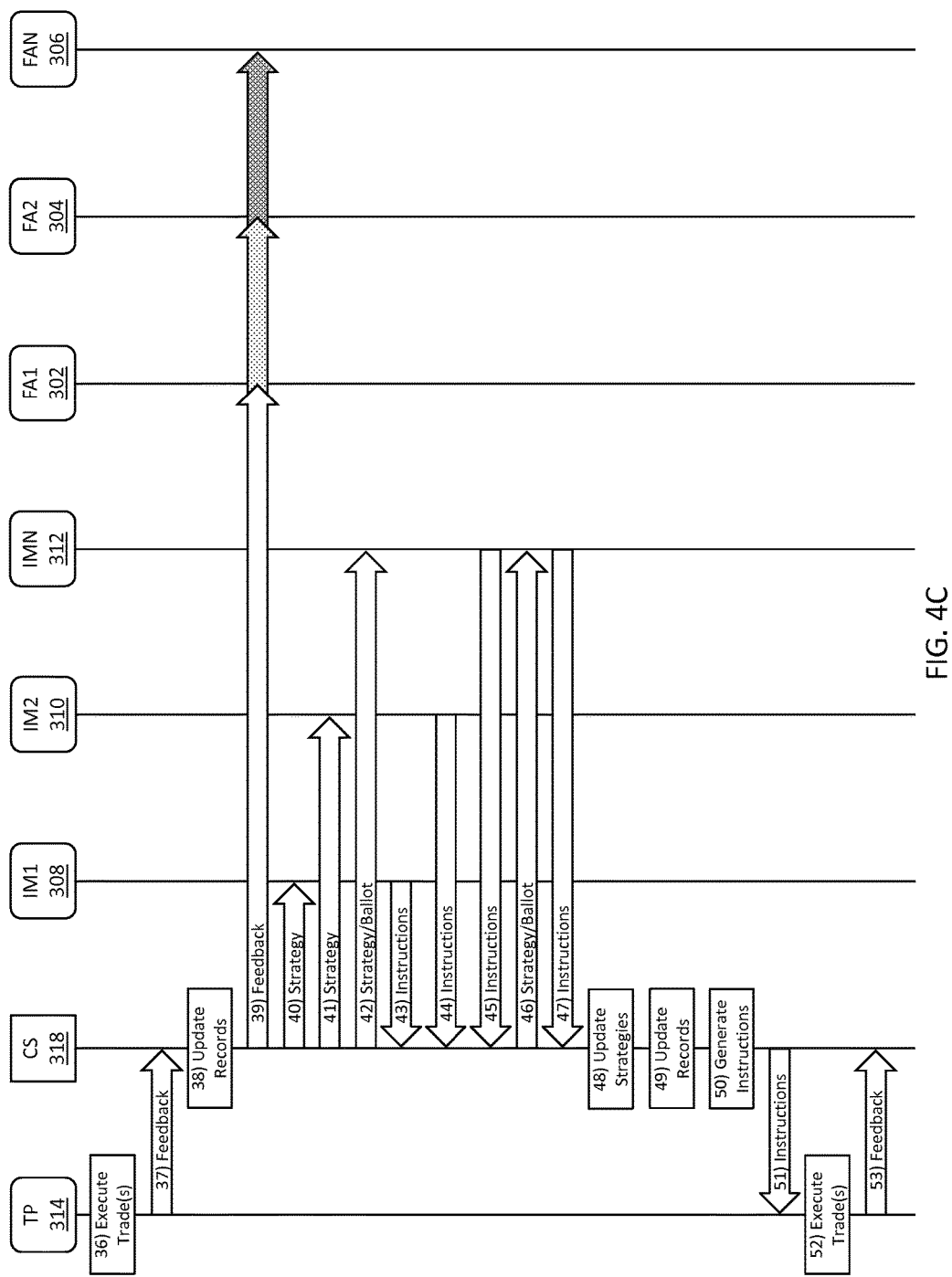
Figure 4D:
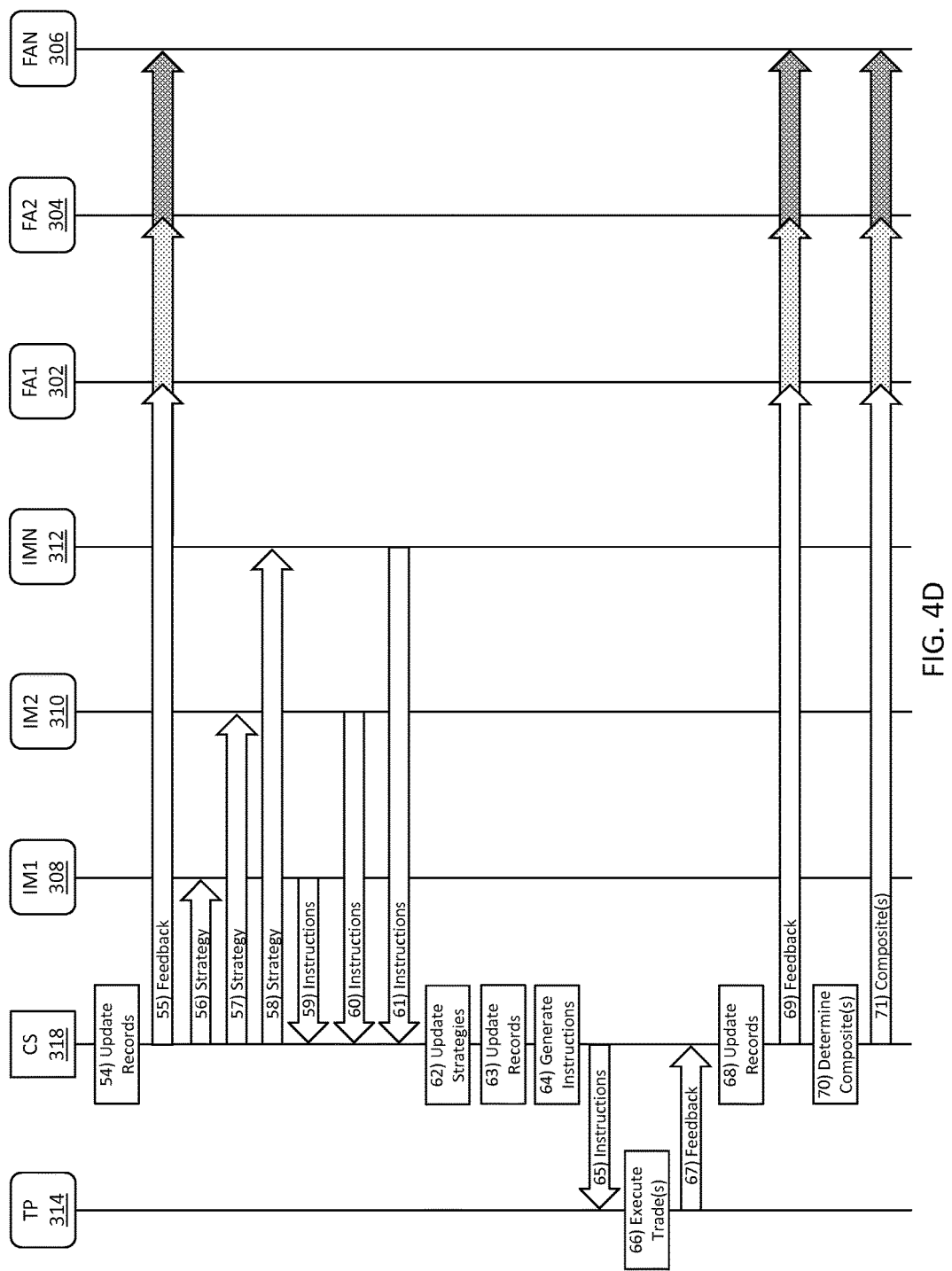
Figure 5:
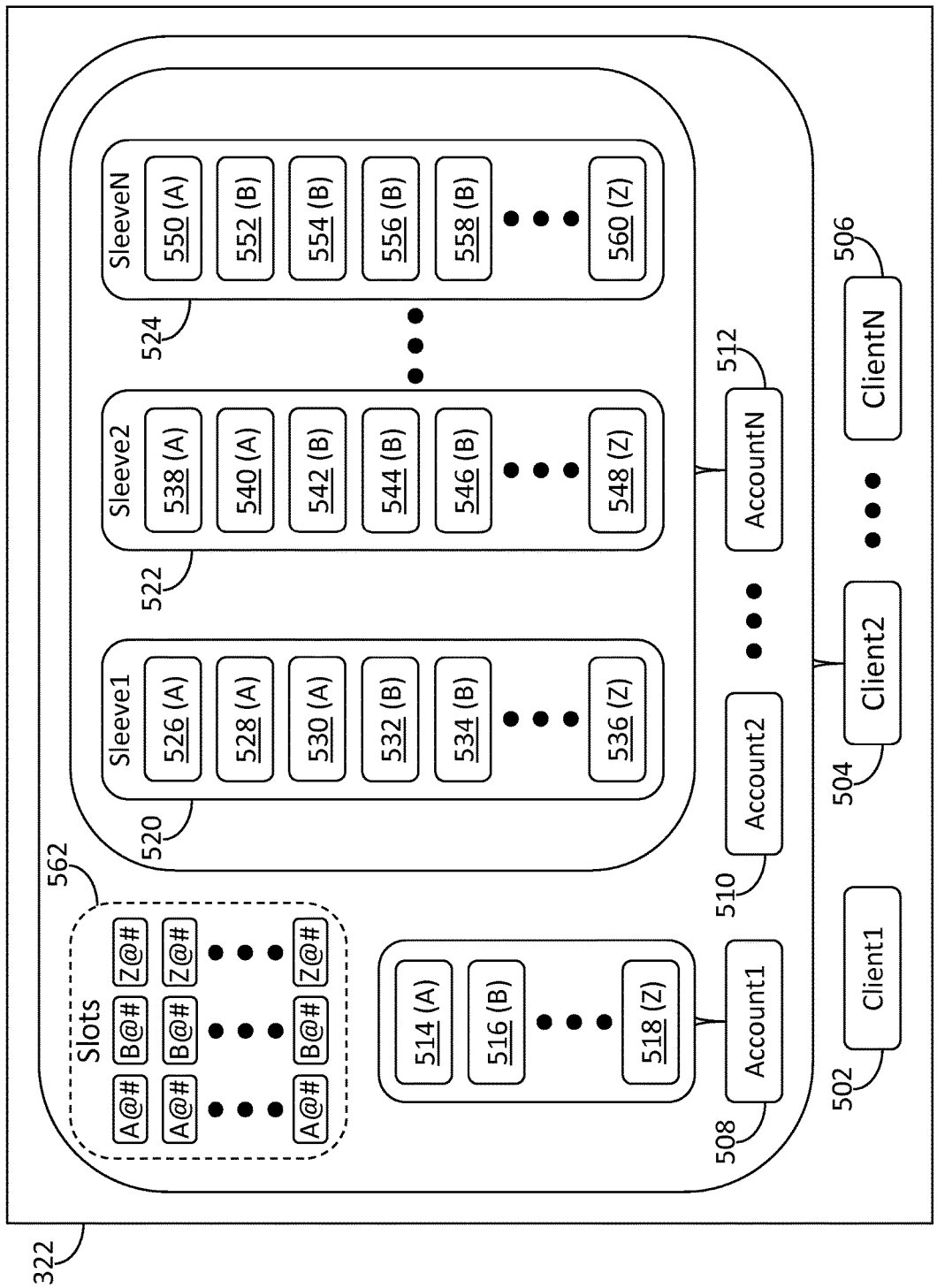
FIG. 5 depicts aspects of various illustrative data structures in accordance with one or more example embodiments.
Figure 6:
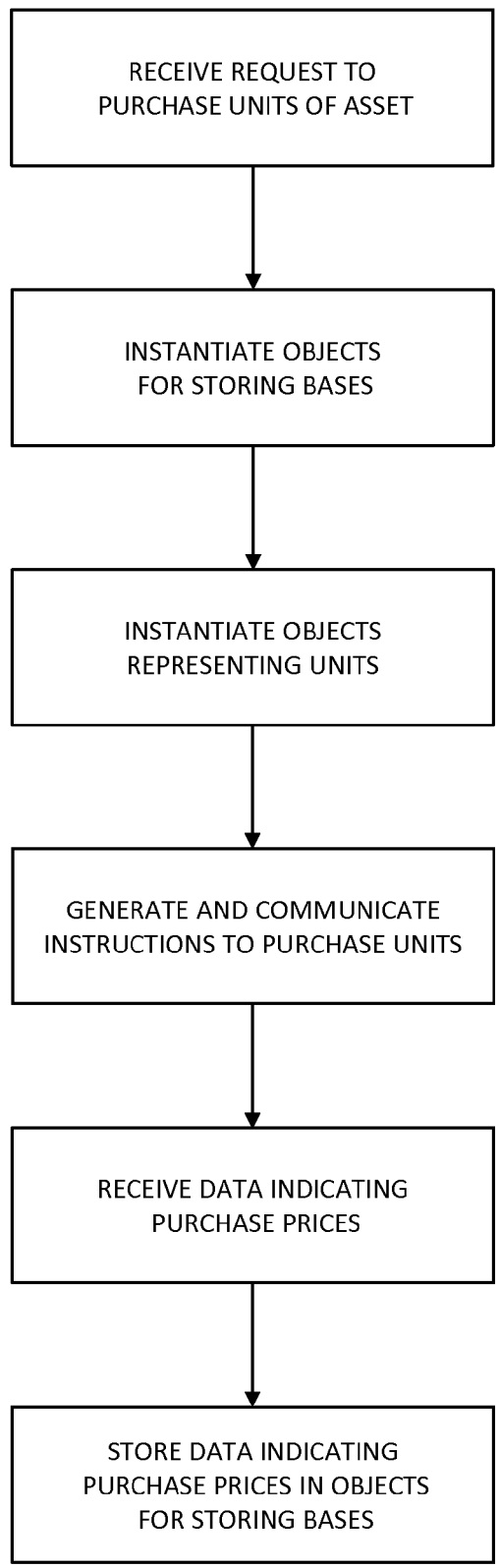
FIG. 6 depicts an illustrative method in accordance with one or more example embodiments.

Referring to FIG. 4B, at step 19, computing system 318 may update records stored in memory 322 based on the instructions received from computing device(s) 302, 304, and 306. For example, referring to FIG. 5, memory 322 may comprise client objects 502, 504, and 506, and the instructions received from computing device(s) 302 may have comprised a request to allocate funds of a client associated with client object 504 amongst one or more of the investment strategies generated by computing system 318. The client associated with client object 504 may maintain one or more accounts (e.g., brokerage accounts, or the like) with the organization, and client object 504 may comprise account objects 508, 510, and 512, each of which may be associated with a particular one of the account(s) maintained by the client associated with client object 504. Account objects 508, 510, and 512 may comprise asset objects representing units of assets held in the corresponding account. For example, account object 508 may comprise asset object 514, representing a unit of asset A held in an account corresponding to account object 508; asset object 516, representing a unit of asset B held in the account corresponding to account object 508; and asset object 518, representing a unit of asset Z held in the account corresponding to account object 508.

Responsive to the request to allocate funds of the client associated with client object 504 amongst one or more of the investment strategies, computing system 318 may instantiate a sleeve object for each investment strategy. For example, the request may have indicated that funds held in an account corresponding to account object 512 should be allocated evenly amongst the investment strategies generated based on the allocations prescribed by the investment managers associated with computing device(s) 308, 310, and 312 (e.g., 33% of the funds to each of the strategies), and computing system 318 may instantiate, in account object 512, sleeve object 520 for the investment strategy generated based on the allocation prescribed by the investment manager associated with computing device(s) 308, sleeve object 522 for the investment strategy generated based on the allocation prescribed by the investment manager associated with computing device(s) 310, and sleeve object 524 for the investment strategy generated based on the allocation prescribed by the investment manager associated with computing device(s) 312.

For each of the investment strategies, computing system 318 may, for each asset prescribed by the allocation (or analogous asset indicated by the strategy), determine, based on a percentage to be invested in the asset indicated by the strategy, a percentage of the funds allocated by the request to the strategy, and a current market price of the asset, a number of units of the asset to be purchased for the account and may, for each unit, instantiate, in the sleeve object for the strategy, an asset object representing the unit. For example, for the investment strategy generated based on the allocation prescribed by the investment manager associated with computing device(s) 308, computing system 318 may determine that three units of asset A, two units of asset B, and one unit of asset Z should be purchased for the account associated with account object 512 and may instantiate, in sleeve object 520, asset objects 526, 528, and 530, representing the three units of asset A; asset objects 532 and 534, representing the two units of asset B; and asset object 536, representing the unit of asset Z.

Similarly, for the investment strategy generated based on the allocation prescribed by the investment manager associated with computing device(s) 310, computing system 318 may determine that two units of asset A, three units of asset B, and one unit of asset Z should be purchased for the account associated with account object 512 and may instantiate, in sleeve object 522, asset objects 538 and 540, representing the two units of asset A; asset objects 542, 544, and 546, representing the three units of asset B; and asset object 548, representing the unit of asset Z; and for the investment strategy generated based on the allocation prescribed by the investment manager associated with computing device(s) 312, computing system 318 may determine that one unit of asset A, four units of asset B, and one unit of asset Z should be purchased for the account associated with account object 512 and may instantiate, in sleeve object 524, asset object 550, representing the unit of asset A; asset objects 552, 554, 556, and 558, representing the four units of asset B; and asset object 560, representing the unit of asset Z.

In some embodiments, computing system 318 may identify, in the account object corresponding to the account, one or more asset objects representing previously purchased units of one or more of the prescribed assets. In such embodiments, computing system 318 may move some or all of the asset objects representing the previously purchased units to one or more of the sleeve objects and may store in memory 322 an indication of the current market price of their corresponding assets and the time at which the asset object(s) were moved to the sleeve object(s). For example, had the request described above been made with respect to an account corresponding to account object 508 (e.g., a request to allocate amongst investment strategies funds of an existing account that have already been invested), computing system 318 may have identified asset objects 514, 516, and 518, allocated (or moved them) to one or more sleeve objects instantiated in response to the request, stored data indicating the current market price of their corresponding assets and the time at which they were allocated to the sleeve object(s), and adjusted (e.g., reduced) the number of units to be purchased accordingly.

In some embodiments, upon instantiating asset objects, computing system 318 may store within them data associating them with an indication of the current market price of their corresponding asset (e.g., trade-dated or pre-settlement data). For example, upon instantiating asset objects 526, 528, 530, 538, 540, and 550, computing system 318 may store within them data associating them with an indication of the current market price for asset A. Similarly, upon instantiating asset objects 532, 534, 542, 544, 546, 552, 554, 556, and 558, computing system 318 may store within them data associating them with an indication of the current market price for asset B; and upon instantiating asset objects 536, 548, and 560, computing system 318 may store within them data associating them with an indication of the current market price for asset Z.

In some embodiments, responsive to determining to purchase a unit of an asset for a client, computing system 318 may instantiate, within an object corresponding to the client, an object comprising a variable for storing a basis for the unit. For example, client object 504 may comprise data structure 562, and responsive to determining to purchase each of the six units of asset A, nine units of asset B, and three units of asset Z for the account corresponding to account object 512, computing system 318 may instantiate, in data structure 562, an object comprising a variable for storing a basis for the unit.

Returning to FIG. 4B, at step 20, computing system 318 may generate instructions to purchase the six units of asset A, nine units of asset B, and three units of asset Z and, at step 21, may communicate (e.g., via communication interface 324 and network(s) 316) the instructions to trading platform(s) 314, which, at step 22, may purchase the units. At step 23, computing system 318 may receive (e.g., via communication interface 324 and network(s) 316) from trading platform(s) 314 data indicating, for each of the units, a price and time at which the unit was purchased (e.g., settlement data). At step 24, responsive to receiving the data from trading platform(s) 314, computing system 318 may update the records stored in memory 322 based on the data.

In some embodiments, for each of the units, computing system 318 may store in memory 322 an indication of the price and time at which the unit was purchased and data associating the asset object representing the unit with the indication. For example, for each of the six units of asset A, computing system 318 may store in memory 322 an indication of the price and time at which the unit was purchased and data associating the indication with the asset object representing the unit (e.g., asset object 526, 528, 530, 538, 540, or 550). Similarly, for each of the nine units of asset B, computing system 318 may store in memory 322 an indication of the price and time at which the unit was purchased and data associating the indication with the asset object representing the unit (e.g., asset object 532, 534, 542, 544, 546, 552, 554, 556, or 558); and for each of the three units of asset Z, computing system 318 may store in memory 322 an indication of the price and time at which the unit was purchased and data associating the indication with the asset object representing the unit (e.g., asset object 536, 548, or 560).

As indicated above, in some embodiments, responsive to determining to purchase a unit of an asset for a client, computing system 318 may instantiate, within an object corresponding to the client, an object comprising a variable for storing a basis for the unit. In such embodiments, responsive to receiving data indicating a price at which the unit was purchased, computing system 318 may store, in the variable for storing the basis for the unit, data indicating the price at which the unit was purchased. For example, responsive to receiving the data from trading platform(s) 314, for each of the six units of asset A, nine units of asset B, and three units of asset Z, computing system 318 may store, in the variable of the corresponding object instantiated in data structure 562, data indicating the price at which the unit was purchased. At step 25, computing system 318 may communicate feedback data generated based on the updated records (e.g., reflecting the purchase of the six units of asset A, nine units of asset B, and three units of asset Z) to computing device(s) 302, 304, and/or 306. In some embodiments, computing system 318 may comprise a brokerage system, and the records stored in memory 322 may comprise books and records (e.g., one or more systems of record) for the brokerage system. It will be appreciated that by associating and/or segregating asset units (e.g., assets of the client associated with client object 504 held within the account associated with account object 512) based on their corresponding investment strategy (e.g., via sleeve objects 520, 522, and 524), computing system 318 may obviate the need for maintaining and/or periodically reconciling against records distinct from those stored in memory 322, that is, records distinct from those maintained on the brokerage system itself (e.g., shadow accounting), for the purpose of identifying or determining with which investment strategy a particular unit of an asset managed by the brokerage system is associated.

At step 26, computing system 318 may generate data indicating the allocation prescribed by the investment manager associated with computing device(s) 308 (and/or the corresponding investment strategy generated by computing system 318) and requesting that the investment manager approve the allocation (and/or corresponding strategy) and may communicate the data to computing device(s) 308. Similarly, at step 27, computing system 318 may generate data indicating the allocation prescribed by the investment manager associated with computing device(s) 310 (and/or the corresponding investment strategy generated by computing system 318) and requesting that the investment manager approve the allocation (and/or corresponding strategy) and may communicate the data to computing device(s) 310; and, at step 28, computing system 318 may generate data indicating the allocation prescribed by the investment manager associated with computing device(s) 312 (and/or the corresponding investment strategy generated by computing system 318) and requesting that the investment manager approve the allocation (and/or corresponding strategy) and may communicate the data to computing device(s) 312.

In some embodiments, responsive to receiving data indicating a plurality of elective options for a dividend to be paid by an issuer of an asset included in an allocation of investments prescribed by an investment manager, computing system 318 may generate a ballot comprising the plurality of elective options for the dividend and may communicate the ballot to one or more computing devices associated with the investment manager. For example, responsive to receiving data indicating a plurality of elective options for a dividend to be paid by an issuer of an asset included in the allocation of investments prescribed by the investment manager associated with computing device(s) 310 and the allocation of investments prescribed by the investment manager associated with computing device(s) 312, computing system 318 may generate a ballot comprising the plurality of elective options and may communicate the ballot to computing device(s) 310 and computing device(s) 312 (e.g., in steps 27 and 28, respectively).

At step 29, computing system 318 may receive data from computing device(s) 308 comprising instructions indicating whether the investment manager associated with computing device(s) 308 has approved the allocation (and/or corresponding strategy) or made one or more modifications to the allocation (and/or corresponding strategy). Similarly, at step 30, computing system 318 may receive data from computing device(s) 310 comprising instructions indicating whether the investment manager associated with computing device(s) 310 has approved the allocation (and/or corresponding strategy) or made one or more modifications to the allocation (and/or corresponding strategy); and, at step 31, computing system 318 may receive data from computing device(s) 312 comprising instructions indicating whether the investment manager associated with computing device(s) 312 has approved the allocation (and/or corresponding strategy) or made one or more modifications to the allocation (and/or corresponding strategy).

At step 32, responsive to determining that the data indicates that one or more of the investment managers have modified their prescribed allocation, computing system 318 may updated the corresponding investment strategies accordingly. At step 33, computing system 318 may update the records stored in memory 322 in accordance with the modified investment strategies. For example, the investment manager associated with computing device(s) 310 may have increased the percentage of invested funds to be allocated to asset B and decreased the percentage of invested funds to be allocated to asset A, while the investment manager associated with computing device(s) 312 may have increased the percentage of invested funds to be allocated to asset A and decreased the percentage of invested funds to be allocated to asset B. Accordingly, computing system 318 may move asset objects representing units of asset A (e.g., asset object 540) from sleeve object 522 to sleeve object 524, may store data indicating the current market price for asset A and the time at which the asset objects were moved from sleeve object 522 to sleeve object 524, may move asset objects representing units of asset B (e.g., asset object 552) from sleeve object 524 to sleeve object 522, and may store data indicating the current market price for asset B and the time at which the asset objects were moved from sleeve object 524 to sleeve object 522 (e.g., in lieu of generating unnecessary trades for the client associated with client object 504 and/or the account associated with account object 512).

Additionally or alternatively, computing system 318 may determine, based on the updated strategies, that a number of units of an asset need to be sold for a sleeve object to generate funds to purchase a number of units of a different asset for the sleeve object, may instantiate asset objects in the sleeve object representing the units to be purchased, and, at step 34, may generate instructions to sell the number of units of the asset and to purchase the number of units of the different asset. At step 35, computing system 318 may communicate the instructions to trading platform(s) 314, which, referring to FIG. 4C, at step 36, may sell the number of units of the asset and purchase the number of units of the different asset. At step 37, computing system 318 may receive data from trading platform(s) 314 indicating the prices and times at which the units were purchased and sold and, at step 38, may update the records stored in memory 322 based on the data received from trading platform(s) 314. At step 39, computing system 318 may communicate feedback data generated based on the updated records to computing device(s) 302, 304, and/or 306.

At step 40, computing system 318 may generate data indicating the allocation prescribed by the investment manager associated with computing device(s) 308 (and/or the corresponding investment strategy generated by computing system 318) and requesting that the investment manager approve the allocation (and/or corresponding strategy) and may communicate the data to computing device(s) 308. Similarly, at step 41, computing system 318 may generate data indicating the allocation prescribed by the investment manager associated with computing device(s) 310 (and/or the corresponding investment strategy generated by computing system 318) and requesting that the investment manager approve the allocation (and/or corresponding strategy) and may communicate the data to computing device(s) 310; and, at step 42, computing system 318 may generate data indicating the allocation prescribed by the investment manager associated with computing device(s) 312 (and/or the corresponding investment strategy generated by computing system 318) and requesting that the investment manager approve the allocation (and/or corresponding strategy) and may communicate the data to computing device(s) 312.

As indicated above, in some embodiments, the data may comprise a ballot generated by computing system 318 and comprising a plurality of elective options for a dividend to be paid by an issuer of an asset included in the allocation of investments prescribed by the investment manager. For example, the data communicated to computing device(s) 312 may include the ballot communicated to computing device(s) 310 and 312 in steps 27 and 28 above, respectively (e.g., computing system 318 may have received data indicating an election made by the investment manager associated with computing device(s) 310 in step 30).

At step 43, computing system 318 may receive data from computing device(s) 308 comprising instructions indicating whether the investment manager associated with computing device(s) 308 has approved the allocation (and/or corresponding strategy) or made one or more modifications to the allocation (and/or corresponding strategy). Similarly, at step 44, computing system 318 may receive data from computing device(s) 310 comprising instructions indicating whether the investment manager associated with computing device(s) 310 has approved the allocation (and/or corresponding strategy) or made one or more modifications to the allocation (and/or corresponding strategy); and, at step 45, computing system 318 may receive data from computing device(s) 312 comprising instructions indicating whether the investment manager associated with computing device(s) 312 has approved the allocation (and/or corresponding strategy) or made one or more modifications to the allocation (and/or corresponding strategy).

Responsive to determining that the instructions received from computing device(s) 312 do not include an election, at step 46, computing system 318 may generate data indicating the allocation prescribed by the investment manager associated with computing device(s) 312 (and/or the corresponding investment strategy generated by computing system 318) and requesting that the investment manager approve the allocation (and/or corresponding strategy) and make an election via the ballot and may communicate the data to computing device(s) 312. At step 47, computing system 318 may receive data from computing device(s) 312 comprising instructions indicating whether the investment manager associated with computing device(s) 312 has approved the allocation (and/or corresponding strategy) or made one or more modifications to the allocation (and/or corresponding strategy) and comprising an election made via the ballot by the investment manager associated with computing device(s) 312.

At step 48, computing system 318 may update the investment strategies based on the data received from computing device(s) 308, 310, and 312 and, at step 49, may update the records stored in memory 322 accordingly. In some embodiments, responsive to identifying funds or units of an asset associated with a dividend paid by an issuer of an asset, computing system 318 may allocate the funds or units to one or more of sleeve objects 520, 522, or 524 which comprised asset objects representing units of the asset on the date for which the dividend was paid and/or in accordance with elections made by their corresponding investment managers. In such embodiments, computing system 318 may determine a number of units of one or more assets that need to be purchased or sold to allocate the funds in the sleeve object in accordance with its corresponding investment strategy. At step 50, computing system 318 may generate instructions to purchase or sell the units, and, at step 51, computing system 318 may communicate the instructions to trading platform(s) 314, which, at step 52, may purchase or sell the units. At step 53, computing system 318 may receive data from trading platform(s) 314 indicating the prices and times at which the units were purchase or sold, and, referring to FIG. 4D, at step 54, may update the records stored in memory 322 based on the data received from trading platform(s) 314. At step 55, computing system 318 may communicate feedback data generated based on the updated records to computing device(s) 302, 304, and/or 306.

At step 56, computing system 318 may generate data indicating the allocation prescribed by the investment manager associated with computing device(s) 308 (and/or the corresponding investment strategy generated by computing system 318) and requesting that the investment manager approve the allocation (and/or corresponding strategy) and may communicate the data to computing device(s) 308. Similarly, at step 57, computing system 318 may generate data indicating the allocation prescribed by the investment manager associated with computing device(s) 310 (and/or the corresponding investment strategy generated by computing system 318) and requesting that the investment manager approve the allocation (and/or corresponding strategy) and may communicate the data to computing device(s) 310; and, at step 58, computing system 318 may generate data indicating the allocation prescribed by the investment manager associated with computing device(s) 312 (and/or the corresponding investment strategy generated by computing system 318) and requesting that the investment manager approve the allocation (and/or corresponding strategy) and may communicate the data to computing device(s) 312.

At step 59, computing system 318 may receive data from computing device(s) 308 comprising instructions indicating whether the investment manager associated with computing device(s) 308 has approved the allocation (and/or corresponding strategy) or made one or more modifications to the allocation (and/or corresponding strategy). Similarly, at step 60, computing system 318 may receive data from computing device(s) 310 comprising instructions indicating whether the investment manager associated with computing device(s) 310 has approved the allocation (and/or corresponding strategy) or made one or more modifications to the allocation (and/or corresponding strategy); and, at step 61, computing system 318 may receive data from computing device(s) 312 comprising instructions indicating whether the investment manager associated with computing device(s) 312 has approved the allocation (and/or corresponding strategy) or made one or more modifications to the allocation (and/or corresponding strategy).

At step 62, computing system 318 may update the investment strategies based on the data received from computing device(s) 308, 310, and 312 and, at step 63, may update the records stored in memory 322 accordingly. In some embodiments, responsive to determining to sell a unit of an asset for the client, the computing system may select, from amongst the plurality of bases for the asset stored in the variables of the objects of data structure 562 a basis for the unit. In some embodiments, computing system 318 may select the basis for the unit based on a predetermined parameter for the client or the account. For example, the predetermined parameter may indicate that a highest available basis for the unit should be utilized for the unit, and computing system 318 may select, from amongst the plurality of bases for the asset, the highest basis. Alternatively, the predetermined parameter may indicate that a lowest available basis for the unit should be utilized for the unit, and computing system 318 may select, from amongst the plurality of bases for the asset, the lowest basis. In some embodiments, the predetermined parameter may comprise a realized gain-loss value for the client. In such embodiments, computing system 318 may select, based on a current market valuation of the unit, a basis having a difference with the current market valuation of the unit that is closest to the realized gain-loss value for the client. In some embodiments, the realized gain-loss value for the client may reflect one or more losses carried forward by the client from a time at least one year prior to a time at which the unit was sold.

At step 64, computing system 318 may generate instructions to purchase or sell the units, and, at step 65, computing system 318 may communicate the instructions to trading platform(s) 314, which, at step 66, may purchase or sell the units. At step 67, computing system 318 may receive data from trading platform(s) 314 indicating the prices and times at which the units were purchase or sold, and, at step 68, may update the records stored in memory 322 based on the data received from trading platform(s) 314. At step 69, computing system 318 may communicate feedback data generated based on the updated records to computing device(s) 302, 304, and/or 306.

At step 70, computing system 318 may determine a performance composite for an investment strategy. For example, computing system 318 may identify, in memory 322, a plurality of account objects comprising a plurality of sleeve objects for the investment strategy and may identify a portion of the plurality of account objects meeting one or more criteria of the performance composite. Computing system 318 may determine the performance composite based on data stored in a portion of the plurality of sleeve objects stored in the portion of the plurality of account objects, may generate a report indicating the performance composite, and, at step 71, may communicate the report to computing device(s) 302, 304, and/or 306.

In some embodiments, for each account object of the portion of the plurality of account objects, computing system 318 may determine that the account object does not comprise data indicating one or more asset restrictions specified by the one or more criteria. In some embodiments, for each account object of the portion of the plurality of account objects, computing system 318 may determine that the account object comprised a sleeve object of the plurality of sleeve objects for each day of a time range specified by the one or more criteria. In such embodiments, computing system 318 may determine a market valuation at a beginning of the time range for assets held within the sleeve object at the beginning of the time range, a market valuation at an end of the time range for assets held within the sleeve object at the end of the time range, and a ratio of the market valuation at the beginning of the time range to the market valuation at the end of the time range.

In some embodiments, the report may comprise a comparison of the performance composite with a plurality of other performance composites. For example, the one or more criteria may specify a time range for the performance composite, and the plurality of other performance composites may comprise one or more performance composites for the investment strategy indicating performance of the investment strategy over one or more periods of time beginning before the time range. Additionally or alternatively, the plurality of other performance composites may comprise one or more performance composites for a different investment strategy indicating performance of the different investment strategy over the time range and/or the one or more periods of time beginning before the time range.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such As metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
    receiving, via a communication interface of a computing system comprising at least one processor and a memory, a request to purchase a number of units of an asset for an account of a client; and
    responsive to receiving the request to purchase the number of the units of the asset for the account of the client, for each unit of the units:
        instantiating, by the at least one processor, in a client object stored in the memory and associated with the client, an object comprising a variable for storing a basis for the unit;
        instantiating, by the at least one processor, in a sleeve object that is stored within an account object stored within the client object and associated with the account, an object representing the unit, wherein the sleeve object corresponds to an investment strategy associated with an allocation of investments prescribed by an investment manager;
        generating, by the at least one processor, instructions to purchase the unit;
        communicating, via the communication interface and to one or more trading platforms, the instructions to purchase the unit;
        receiving, via the communication interface and from the one or more trading platforms, data indicating a price and time at which the unit was purchased; and
        responsive to receiving the data indicating the price and time at which the unit was purchased:
            storing, by the at least one processor and in the memory, an indication of the price and time at which the unit was purchased and data associating the indication with the object representing the unit; and
            storing, by the at least one processor and in the object comprising the variable for storing the basis for the unit, data indicating the price at which the unit was purchased.

2. The method of claim 1, further comprising:
    receiving, via the communication interface, a request to sell a portion of the units; and
    responsive to receiving the request to sell the portion of the units, for each unit of the portion:
        selecting, by the at least one processor, from amongst a plurality of bases for the asset stored in a plurality of objects associated with the asset and stored in the client object, and based on a predetermined parameter for the client, a basis for the unit; and
        after the selecting:
            generating, by the at least one processor, instructions to sell the unit;
            communicating, via the communication interface and to the one or more trading platforms, the instructions to sell the unit;
            receiving, via the communication interface and from the one or more trading platforms, data indicating a price at which the unit was sold; and
            responsive to receiving the data indicating the price at which the unit was sold, determining, by the at least one processor, a difference between the basis for the unit and the price at which the unit was sold.

3. The method of claim 2, wherein the predetermined parameter for the client indicates that a highest available basis for the unit should be utilized for the unit, and wherein selecting the basis for the unit comprises selecting, from amongst the plurality of bases for the asset, the highest basis.

4. The method of claim 2, wherein the predetermined parameter for the client indicates that a lowest available basis for the unit should be utilized for the unit, and wherein selecting the basis for the unit comprises selecting, from amongst the plurality of bases for the asset, the lowest basis.

5. The method of claim 2, wherein selecting the basis for the unit comprises selecting, from amongst the plurality of bases for the asset, a basis associated with a unit of the asset purchased for a different account of the client.

6. The method of claim 2, wherein the predetermined parameter for the client comprises a realized gain-loss value for the client, and wherein selecting the basis for the unit comprises selecting, from amongst the plurality of bases for the asset and based on a current market valuation of the unit, a basis having a difference with the current market valuation of the unit that is closest to the realized gain-loss value for the client.

7. The method of claim 6, wherein the realized gain-loss value for the client reflects losses carried forward by the client from a time at least one year prior to a time at which the unit was sold.

8. A system comprising:
    a communication interface;
    at least one processor; and
    a memory comprising instructions that when executed by the at least one processor cause the system to:
        receive, via the communication interface, a request to purchase a number of units of an asset for an account of a client; and
        responsive to receiving the request to purchase the number of the units of the asset for the account of the client, for each unit of the units:
            instantiate, in a client object stored in the memory and associated with the client, an object comprising a variable for storing a basis for the unit;
            instantiate, in a sleeve object that is stored within an account object stored within the client object and associated with the account, an object representing the unit, wherein the sleeve object corresponds to an investment strategy associated with an allocation of investments prescribed by an investment manager;
            generate instructions to purchase the unit;
            communicate, via the communication interface and to one or more trading platforms, the instructions to purchase the unit;

receive, via the communication interface and from the one or more trading platforms, data indicating a price and time at which the unit was purchased; and responsive to receiving the data indicating the price and time at which the unit was purchased:

store, in the memory, an indication of the price and time at which the unit was purchased and data associating the indication with the object representing the unit; and store, in the object comprising the variable for storing the basis for the unit, data indicating the price at which the unit was purchased.

9. The system of claim 8, wherein the instructions, when executed by the at least one processor, cause the system to:

receive, via the communication interface, a request to sell a portion of the units; and responsive to receiving the request to sell the portion of the units, for each unit of the portion:

select, based on a predetermined parameter for the client and from amongst a plurality of bases for the asset stored in a plurality of objects associated with the asset and stored in the client object, a basis for the unit; and after selecting the basis for the unit:

generate, by the at least one processor, instructions to sell the unit;

communicate, via the communication interface and to the one or more trading platforms, the instructions to sell the unit;

receive, via the communication interface and from the one or more trading platforms, data indicating a price at which the unit was sold; and responsive to receiving the data indicating the price at which the unit was sold, determine a difference between the basis for the unit and the price at which the unit was sold.

10. The system of claim 9, wherein the predetermined parameter for the client indicates that a highest available basis for the unit should be utilized for the unit, and wherein the instructions, when executed by the at least one processor, cause the system to select, from amongst the plurality of bases for the asset, the highest basis.

11. The system of claim 9, wherein the predetermined parameter for the client indicates that a lowest available basis for the unit should be utilized for the unit, and wherein the instructions, when executed by the at least one processor, cause the system to select, from amongst the plurality of bases for the asset, the lowest basis.

12. The system of claim 9, wherein the instructions, when executed by the at least one processor, cause the system to select, from amongst the plurality of bases for the asset, a basis associated with a unit of the asset purchased for a different account of the client.

13. The system of claim 9, wherein the predetermined parameter for the client comprises a realized gain-loss value for the client, and wherein the instructions, when executed by the at least one processor, cause the system to select, from amongst the plurality of bases for the asset and based on a current market valuation of the unit, a basis having a difference with the current market valuation of the unit that is closest to the realized gain-loss value for the client.

14. The system of claim 13, wherein the realized gain-loss value for the client reflects losses carried forward by the client from a time at least one year prior to a time at which the unit was sold.

15. One or more non-transitory computer-readable media comprising instructions that when executed by at least one processor of a computing system comprising a communication interface and a memory cause the computing system to:

receive, via the communication interface, a request to purchase a number of units of an asset for an account of a client; and responsive to receiving the request to purchase the number of the units of the asset for the account of the client, for each unit of the units:

instantiate, in a client object stored in the memory and associated with the client, an object comprising a variable for storing a basis for the unit;

instantiate, in a sleeve object that is stored within an account object stored within the client object and associated with the account, an object representing the unit, wherein the sleeve object corresponds to an investment strategy associated with an allocation of investments prescribed by an investment manager;

generate instructions to purchase the unit;

communicate, via the communication interface and to one or more trading platforms, the instructions to purchase the unit;

receive, via the communication interface and from the one or more trading platforms, data indicating a price and time at which the unit was purchased; and responsive to receiving the data indicating the price and time at which the unit was purchased:

store, in the memory, an indication of the price and time at which the unit was purchased and data associating the indication with the object representing the unit; and store, in the object comprising the variable for storing the basis for the unit, data indicating the price at which the unit was purchased.

16. The one or more non-transitory computer-readable media of claim 15, wherein the instructions, when executed by the at least one processor, cause the computing system to:

receive, via the communication interface, a request to sell a portion of the units; and responsive to receiving the request to sell the portion of the units, for each unit of the portion:

select, based on a predetermined parameter for the client and from amongst a plurality of bases for the asset stored in a plurality of objects associated with the asset and stored in the client object, a basis for the unit; and after selecting the basis for the unit:

generate, by the at least one processor, instructions to sell the unit;

communicate, via the communication interface and to the one or more trading platforms, the instructions to sell the unit;

receive, via the communication interface and from the one or more trading platforms, data indicating a price at which the unit was sold; and responsive to receiving the data indicating the price at which the unit was sold, determine a difference between the basis for the unit and the price at which the unit was sold.

17. The one or more non-transitory computer-readable media of claim 16, wherein the predetermined parameter for the client indicates that a highest available basis for the unit should be utilized for the unit, and wherein the instructions, when executed by the at least one processor, cause the computing system to select, from amongst the plurality of bases for the asset, the highest basis.

18. The one or more non-transitory computer-readable media of claim 16, wherein the predetermined parameter for the client indicates that a lowest available basis for the unit should be utilized for the unit, and wherein the instructions, when executed by the at least one processor, cause the computing system to select, from amongst the plurality of bases for the asset, the lowest basis.

19. The one or more non-transitory computer-readable media of claim 16, wherein the instructions, when executed by the at least one processor, cause the computing system to select, from amongst the plurality of bases for the asset, a basis associated with a unit of the asset purchased for a different account of the client.

20. The one or more non-transitory computer-readable media of claim 16, wherein the predetermined parameter for the client comprises a realized gain-loss value for the client, and wherein the instructions, when executed by the at least one processor, cause the computing system to select, from amongst the plurality of bases for the asset and based on a current market valuation of the unit, a basis having a difference with the current market valuation of the unit that is closest to the realized gain-loss value for the client.

* * * * *